Oct. 16, 1934.　　B. M. LOFQUIST ET AL　　1,977,236

BICYCLE PEDAL MECHANISM

Filed May 24, 1933

Inventors
Bror M. Lofquist
Sixten J. Olson
By Attorneys
Southgate Tracy & Hawley Patented Oct. 16, 1934

1,977,236

UNITED STATES PATENT OFFICE 1,977,236

BICYCLE PEDAL MECHANISM

Bror M. Lofquist and Sixten J. Olson, Fitchburg, Mass.

Application May 24, 1933, Serial No. 672,653

2 Claims. (Cl. 208—69)

This invention relates to bicycles and the general object of the invention is to provide means for increasing the mechanical advantage of the rider during the power stroke.

To the attainment of this object, we provide a construction by which the effective crank leverage is increased during the power stroke while the ground clearance remains unchanged.

In the preferred form, our invention contemplates the provision of a supplementary crank shaft, together with parallel links on which the pedals are rotatably supported.

Our invention further relates to arrangements and combinations of parts which will be hereinafter described and more particularly pointed out in the appended claims.

A preferred form of the invention is shown in the drawing, in which

Figure 1:
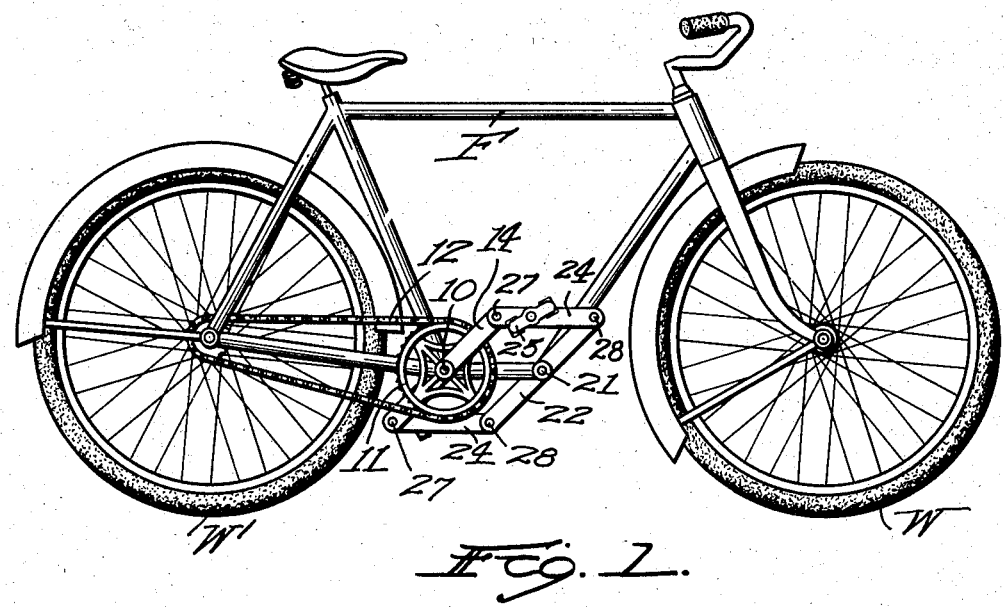
Fig. 1 is a side elevation of a bicycle embodying our improvements.
Figure 2:
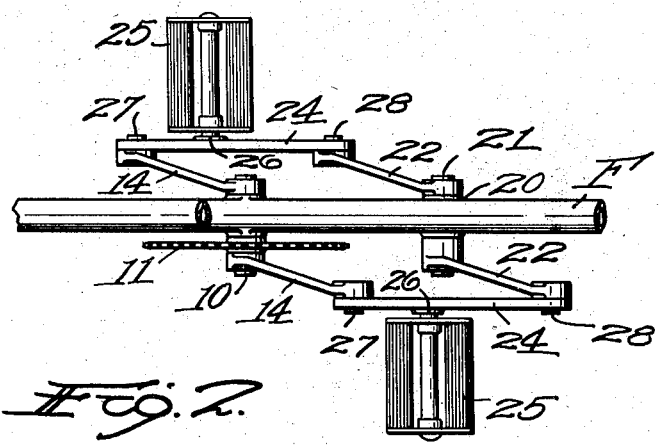
Fig. 2 is an enlarged plan view of the pedal mechanism.

Referring to the drawing, we have shown a bicycle of the usual type comprising front and rear wheels W and W', a frame F and a crank shaft 10 mounted in the usual crank shaft bearing in the frame F. A sprocket 11 is mounted on the crank shaft 10 and is connected by a chain 12 to a sprocket on the rear wheel W' as in the usual commercial construction. Crank arms 14 are provided, one at each end of the crank shaft 10.

The frame F is slightly modified from the usual construction to provide a second or forward crank shaft bearing 20 for a forward or supplemental crank shaft 21 provided with crank arms 22 which are preferably of the same length as the crank arms 14 on the regular crank shaft 10.

The outer ends of the crank arms 14 and 22 are connected by parallel links 24, and pedals 25 are mounted on pedal bearing members 26 which are secured in the sides of the parallel links 24 and preferably at points substantially nearer to the rear pivot studs 27 in the outer ends of the arms 14. The pedals 25 may be of any usual or preferred construction.

As the links 24 are always parallel and are always horizontal, it will be evident that the pedal bearing members 26 travel in similar paths and that the effective axis of these paths is in the plane of the crank shafts 10 and 21 and at a point intermediate said crank shafts and in the same horizontal relation thereto as the pedal bearing members 26 with respect to the pivot studs 27 and 28.

An advantageous application of power to the crank shaft 10 is thus effected, while normal ground clearance remains unchanged.

The mounting of the pedals upon links jointly supported by two sets of crank shafts and crank arms also provides for a firm and effective application of power.

Having thus described our invention and the advantages thereof, we do not wish to be limited to the details herein disclosed, otherwise than as set forth in the claims, but what we claim is:—

1. In a bicycle, a main crank shaft, a supplemental crank shaft, crank arms on said crank shafts all of equal length, parallel links of equal length connecting the outer ends of said crank arms on each side of said bicycle, and pedals pivotally mounted on said links at points intermediate the ends thereof and substantially removed from both points of pivotal connection of said links to said crank arms.

2. In a bicycle, a main crank shaft, a supplemental crank shaft, crank arms on said crank shafts all of equal length, parallel links of equal length connecting the outer ends of said crank arms on each side of said bicycle, and pedals pivotally mounted on said links at points intermediate the ends thereof and substantially removed from both points of pivotal connection of said links to said crank arms, said pivot points of said pedals being substantially rearward of the centers of length of said links.

BROR M. LOFQUIST.
SIXTEN J. OLSON.